United States Patent [19]

Nathan

[11] 3,998,735
[45] Dec. 21, 1976

[54] APPARATUS AND METHOD FOR SEPARATING A MOTHER LIQUOR INTO A CONCENTRATED PARTICULATE FRACTION AND A FILTRATE FRACTION

[76] Inventor: Ira M. Nathan, 275 Central Park West, New York, N.Y. 10024

[22] Filed: May 19, 1976

[21] Appl. No.: 687,847

[52] U.S. Cl. .................. 210/77; 210/108; 210/158; 210/297; 210/333 R; 210/393; 210/411; 210/DIG. 23
[51] Int. Cl.² ........................................ B01D 33/26
[58] Field of Search .......... 210/77, 106, 107, 108, 210/158, 159, 161, 236, 275, 297, 324, 327, 332, 333, 334, 354, 355, 357, 359, 386, 387, 391, 393, 409, 411, DIG. 23

[56] References Cited

UNITED STATES PATENTS

| 1,568,572 | 1/1926 | Shaw | 210/158 |
|---|---|---|---|
| 1,610,431 | 12/1926 | D'Olier | 210/158 |
| 1,740,578 | 12/1929 | D'Olier | 210/158 |
| 1,992,005 | 2/1935 | Goldsborough | 210/158 |
| 2,013,971 | 9/1935 | Raisch | 210/158 |
| 2,679,193 | 5/1954 | Cram | 210/236 |
| 2,939,582 | 6/1960 | Giles | 210/107 |
| 3,282,427 | 11/1966 | Mandarino et al. | 210/108 |
| 3,306,458 | 2/1967 | Hirs | 210/108 |
| 3,839,200 | 10/1974 | Gigov et al. | 210/259 |

OTHER PUBLICATIONS

"Active Blood Filtration;" Doctorial Dissertation of Ira M. Nathan; New York Univ., N.Y.; 1974.

Primary Examiner—Frank W. Lutter
Assistant Examiner—Frank Sever
Attorney, Agent, or Firm—Blum, Moscovitz, Fridman & Kaplan

[57] ABSTRACT

An apparatus provides for continuous filtration of a mother liquor and continuous removal of solids from the filter element so that the apparatus need not be shut down for cleaning or replacement of the filter element. The solids are separated from the mother liquor as a concentrated suspension and the apparatus can be replicated in stages using successively finer filters so that a filtrate free of particles above any specified particle size can be obtained.

8 Claims, 8 Drawing Figures

APPARATUS AND METHOD FOR SEPARATING A MOTHER LIQUOR INTO A CONCENTRATED PARTICULATE FRACTION AND A FILTRATE FRACTION

BACKGROUND OF THE INVENTION

I have previously disclosed a filter assembly in the shape of a cylinder in which the filter element is a cloth mounted in a circular rim which can be rotated continuously. The filter element divides the cylinder into two chambers, each of which contains a small sector which is essentially sealed off from the chamber so far as transfers of liquids therebetween is concerned. However, the solids collected on the filter are carried by the filter element during its rotation into the sector through which a backwash fluid is transferred in a direction opposite to that of the flow of the mother liquor through the two chambers and the filter element. The backwash fluid removes the solid from the filter element, thereby cleaning it so that when the cleaned portion leaves the sector it is ready for removal of further solid from further mother liquor.

A major problem with this prior device is that fluid from the chamber tends to enter the sector with the solid, if the pressure in the chamber is greater than that in the sector. Conversely, if the pressure is greater in the sector than in the chamber, fluid tends to flow from the sector into the chamber, carrying with it solid matter which should be leaving the sector through a port connecting the sector with a sump.

A second problem experienced has been the fact that where there is a mixture of solids of various particle sizes, the use of a filter element of fine enough pore size to remove the smallest particles results in an extremely low rate of filtration. Conversely, if the filter element is of larger pore size, then the low end of the range of particles will penetrate the filter and enter the filtrate.

As is evident, it would be desirable that the system be modified so that the problem of fluid flow between the sector and the chamber be minimized and so that fine particle sizes could be removed from the mother liquor at a relatively high rate of filtration.

SUMMARY OF THE INVENTION

A filter assembly includes a cylindrical housing divided into an input chamber and an output chamber by a rotating filter element. The input chamber has therein a collector pocket which is essentially sectorial in shape said sector being formed of a front and a rear wall, each making contact with an end face of the cylinder and the filter element, and each wall being approximately radial. The front wall is serrated into grooves and lands at one edge thereof, the lands making contact with the filter element. The grooves permit solids connected on the filter element to enter the sector as the filter element rotates. Moreover, the grooves are small enough in size so that the rate of fluid flow between the sector and the input chamber is negligible. The leading edges of the lands are tapered to guide the solids on the rotating filter element into the adjacent grooves.

The apparatus is suitable for continuous operation, the apparatus including a storage tank into which mother liquor can be fed, a particulate pump for receiving the solids washed from the filter element and a filtrate sump to receive filtrate from the exit side of the filter assembly. A pump is provided for returning filtrate as backwash fluid to a narrow slot in a sector in the exit chamber of the assembly, the narrow slot providing for a high velocity jet to effectively remove solid cake from the filter element. The sectors in the two chambers are in registry with each other, so that backwash fluid from the slot, on penetrating the filter element enters the collector. The rate of return of filtrate to be used as backwash is lower than the rate of feed of the mother liquor. As filtrate and particulate collect during operation of the system, they may be intermittently or continuously removed.

The apparatus can be modified by providing a plurality of such filter assemblies to be operated in series. In such operation, the filtrate from a filter assembly is supplied as mother liquor to a succeeding or "downstream" filter assembly. Further, the backwash fluid from a filter assembly is supplied to the next filter assembly upstream. Each succeeding filter assembly in the downstream direction has therein a filter element of finer pore size than the next filter assembly upstream. As a result, large particles never encounter a screen of unnecessarily fine porosity so that the rate of filtration of the apparatus operating as a whole is high. Moreover, the filter cake removed from a filter assembly by backwash fluid which then enters the next filter assembly upstream will pass readily through the filter element of the next upstream filter assembly because of the fact that the particle size is small relative to the pore size of the next upstream and succeeding upstream filter elements.

It is recognized that the apparatus of the present invention when operated in accordance with the method of the present invention separates a mother liquor into a particulate fraction with a high concentration of particulate matter therein and a filtrate fraction free of particles larger than correspond to the pore size of the finest filter used.

An object of the present invention is an apparatus in which the serrated edge of a wall is used to facilitate passage of filtered solid between said wall edge and a filter element while blocking the flow of fluid through the grooves in the edge of said wall.

Another object of the present invention is an apparatus in which a rotating filter element is cleaned by means of a jet of backwash fluid emanating from a narrow slot at high velocity.

A further object of the present invention is a filter assembly which can be replicated in a plurality of stages operable in sequence to provide for removal of fine particles from a mother liquor at high rate.

An important object of the present invention is an apparatus for continuous filtration of a mother liquor and separation thereof into a filtrate and a concentrate containing suspended particulate matter.

A significant object of the present invention is a method of operating a single filter assembly containing a rotating filter element or a plurality of such filter assemblies either on a continuous or on a batch basis to separate a mother liquor into a filtrate and a highly concentrated suspension of particulate matter.

Still other objects and advantages of the invention will in part be obvious and will in part be apparent from the specification.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
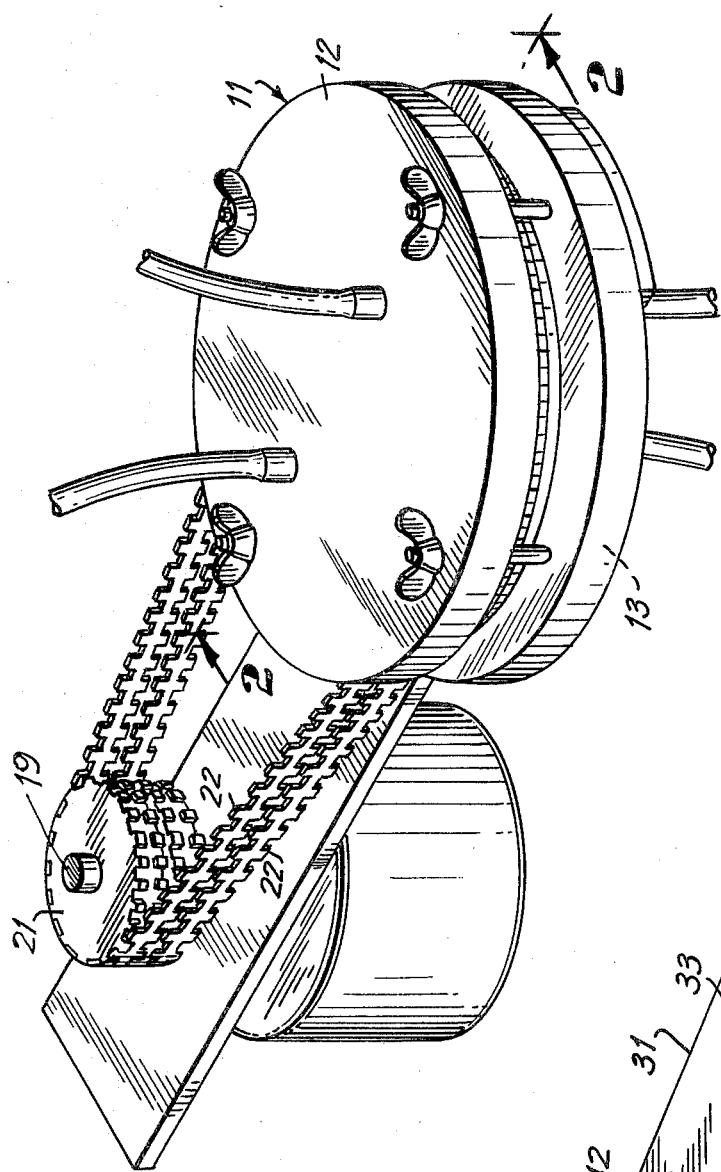
FIG. 1 is a view in perspective of a filter assembly in accordance with the present invention.

FIG. 1 shows a filter assembly indicated generally by the reference numeral 11, the filter assembly itself including an upper end wall 12, a lower end wall 13, a cylindrical side wall 14 (FIG. 2) and a rotatable filter element 16 dividing the assembly into an upper chamber 17 and a lower chamber 18. Rotatable filter element 16 is driven by a motor, not shown, connected to shaft 19 supporting pully 21 which is connected to filter element 16 for rotating said element by drive belts 22.

Mother liquor to be filtered enters the upper chamber 17 through conduit 23. The major portion of filter element 16 is available for filtration of mother liquor. The mother liquor minus particulate matter which deposits on filter element 16 enters the lower chamber 18 as filtrate and leaves lower chamber 18 through conduit 24.

Figure 4:
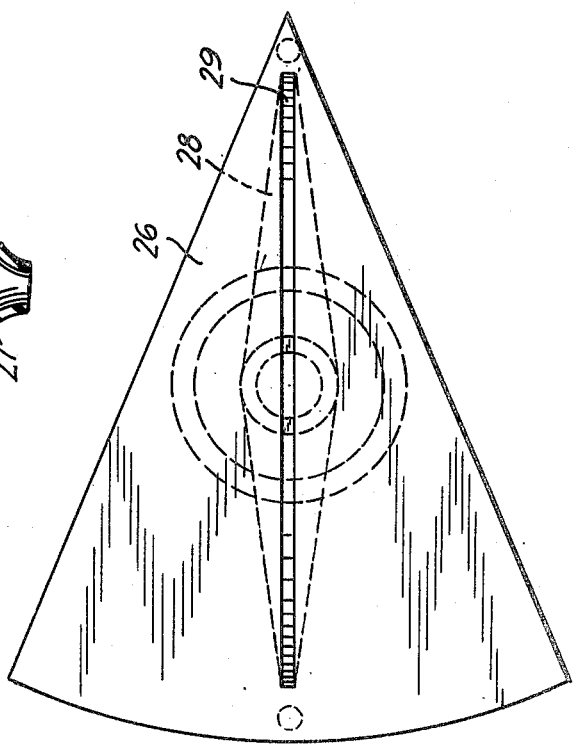
FIG. 4 is a view taken along line 4—4 of FIG. 2.

A minor portion of lower chamber 18 is occupied by a slotted injector for projecting a knife-like jet of backwash fluid against the filter element to free it of collected deposit, i.e., filter cake. The injector 26 is shown in plan view of FIG. 4. Backwash fluid entry port 27 brings backwash fluid under pressure into cavity 28 which narrows down to slot 29. Slot 29 is conveniently about 0.003 inches in width. The purpose of the restricted slot is to project backwash fluid at high velocity against filter element 16 so as to remove therefrom solid deposit.

Figure 3A:
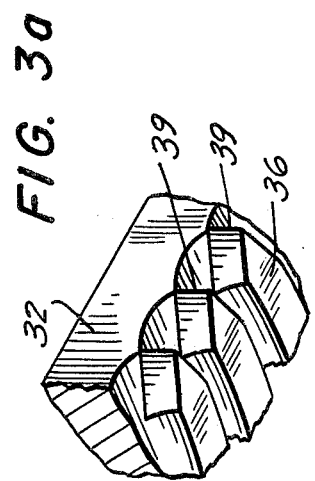
FIG. 3a is a view of a portion of FIG. 3.
Figure 3:
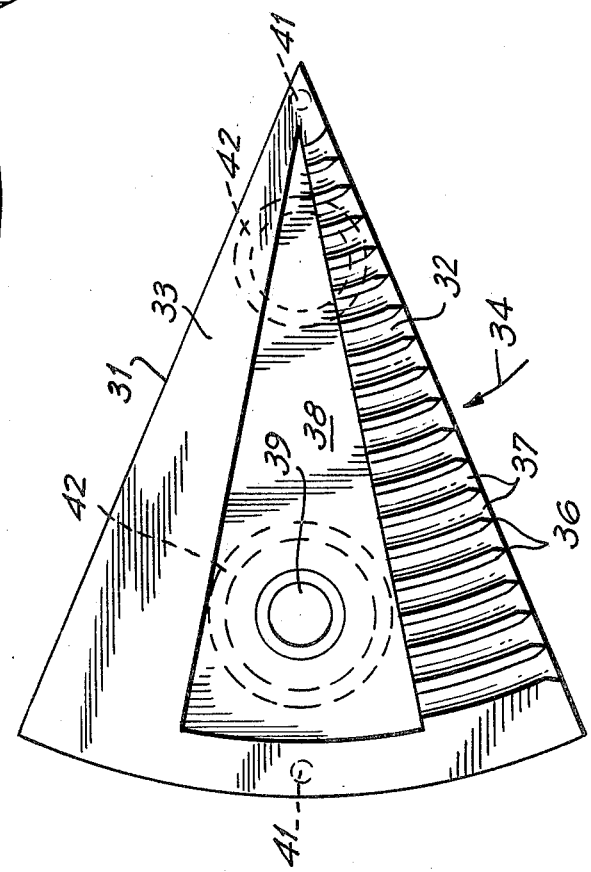
FIG. 3 is a view taken along line 3—3 of FIG. 2.

Upper chamber 17 has therein a collector pocket 31 in registry with injector 26. This pocket is shown as viewed from below in FIG. 3. It should be noted that although the assembly is shown with a vertical axis and with the chamber 17 above the chamber 18, the assembly can be successfully operated when mounted with its axis in any orientation, and even with chamber 17 below filter element 16.

Collector pocket 31 is sectorial in shape as is injector 26. Collector pocket 31 has a front wall 32 and a rear wall 33, the designations front wall and rear wall being relative to the direction of movement of the filter element as indicated by arrow 34. Front wall 32 is serrated into lands 36 and grooves 37. As aforenoted, collector pocket 31 lies immediately opposite injector 26 and is in registry therewith so that the backwash fluid issuing from slot 29 and passing through filter element 16 enters cavity 38, and leaves the cylindrical housing through backwash fluid exit port 39, departing the assembly through conduit 41.

The operation of the filter assembly as well as further constructional details are given in my dissertation entitled "Active Blood Filtration," published in 1974, the work having been done at the School of Education of New York University, New York, New York.

The purpose of the serrations is, first of all, to provide grooves through which collected particulate matter can enter cavity 38 and encounter the backwash fluid jet produced by slot 29. As aforenoted, the relatively narrow grooves restrict the quantity of fluid which can pass therethrough in the event that the pressure on one side of front wall 32 is greater than on the other. In general, passage of a minor quantity of fluid across the wall does not present a serious problem since filtrate is preferably used as the backwash fluid and since the mother liquor is recirculated to concentrate the particulate matter. However, as is obvious, if major quantities of fluid cross the wall, the length of time required for filtration of a given quantity of mother liquor will be increased.

The lands 36 provide a further advantage in that they support the filter element against the force of the jet emitted from slot 29. In the version described in my dissertation, the lands have blunt forward ends. This caused difficulty in that particulate matter deposited on the screen piled up against these ends, interfering with the operation of the assembly. According to the present invention, ends 39 of lands 36 are brought to a point, and the taper guides the deposited particulate matter into grooves 37, thereby avoiding the pile-up.

It has been found desirable to match the collector pocket 31 with respect to the size of the lands and grooves to the quantity of deposit and the rate of rotation of the filter element. Consequently, it is preferable that the collector pocket 31 be so constructed that it can be removed and replaced. Precise positioning is obtained through the use of pins 41, and effective seals are provided by suitably-located gaskets 42.

Using a 3-inch diameter disc, a convenient length for the slot is about 1¼-inch long. In the removal of aggregates from blood, a cloth filter element is convenient. In a test on an aqueous mother liquor containing 8.1 grams of solid particulate matter per 100 milliliters of water, where the average diameter of the particulate matter was 0.45 $\mu$, the rate of feed of mother liquor was 2 liters per minute and the backwash flow rate was 400 milliliters per minute. In a single pass it was found that a filter element having pores with an average diameter between 4 and 6 microns removed 4.9 grams of the particulate matter. In a similar test on the effluent from a paper mill, 80% of the fibrous material was removed in a single pass. A filter of this type has also been found useful in the removal of cane pulp from the effluent from a sugar refinery.

Figure 5:
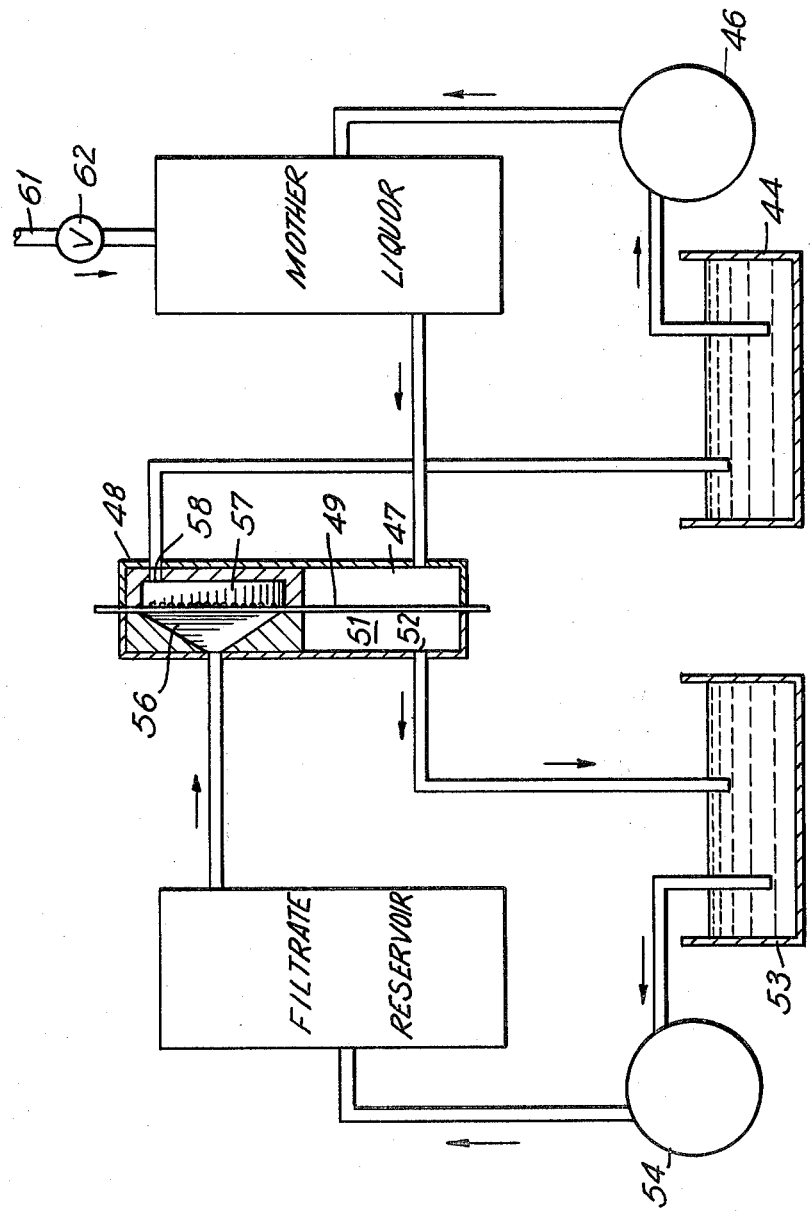
FIG. 5 is a schematic diagram of a filter assembly in accordance with the present invention in combination with associated elements for supplying mother liquor and removal of filtrate and particulate concentrate.

An embodiment of the invention which allows recirculation of both the mother liquor and the filtrate where the filtrate is used as the backwash fluid, and which can be operated on either a continuous or a batch basis is shown in FIG. 5. Where the system is to be operated on a batch basis, the batch may be introduced into particulate sump 44 from which it is removed by pump 46 and introduced into chamber 47 of filter assembly 48. Rotatable filter element 49 may be of cloth, of metal screen, of sintered powdered metal or of any other convenient material which provides openings of the desired size. A deposit (not shown) forms on the upstream side of filter element 49 and the filtrate passes into chamber 51, leaving through filtrate exit port 52 and thence to filtrate sump 53. Filtrate from the sump is then transferred by pump 54 to slot injector 56 to dislodge filter cake from filter element 49 and form a concentrated suspension which passes out through collector 57, backwash fluid exit port 58 and thence to particulate sump 44.

When run on a batch basis, two products are obtained, namely a filtrate freed of particulate matter to an extent commensurate with the pore size of filter element 49 and a particulate concentrate containing virtually all of the particulate matter originally present in the mother liquor. As is evident, filtrate will not accumulate in the sump 53 unless the rate of backwash supplied by pump 54 is lower than the rate at which filtrate enters said sump, this latter rate being essentially equal to the rate at which pump 46 sends the mother liquor to chamber 47. Pump 54 should be sized so that its displacement per unit of time is lower than that of pump 46, or, alternatively, pump 54 should be adjustable to insure that its displacement is less than that of pump 46.

When the apparatus of FIG. 5 is operated continuously, it is convenient to insert a storage tank 59 between pump 46 and chamber 47. Mother liquor can be introduced continuously through conduit 61 which conveniently is fitted with a shut-off valve 62. Provision can then be made for removal of filtrate continuously from filtrate sump 53 and for removal of particulate concentrate continously from particulate sump 44.

Figure 6:
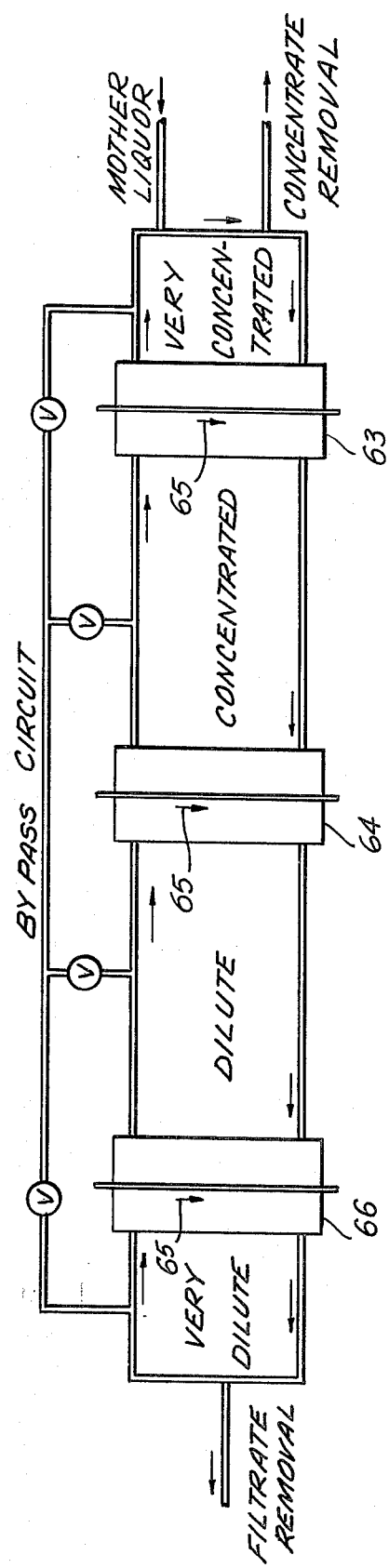
FIG. 6 is a schematic diagram showing flow paths through a multistage apparatus in accordance with the present invention.

The apparatus of FIG. 5 is readily modified to operate in cascade. Advantageously, a plurality of filter assemblies are stacked in sequence, the filter element in each succeeding filter assembly being of finer pore size. In the flow diagram of FIG. 6, filter assembly 63 provides filtrate as mother liquor to succeeding filter assembly 64 which, in turn, provides filtrate as mother liquor to succeeding filter assembly 66. Viewing mother liquor as the principal stream, filter assembly 66 is downstream from filter assembly 64 which is downstream from filter assembly 63. Further, part of the filtrate from filter assembly 66 is recycled as backwash fluid through the injector slot and collector of filter assembly 66 and then successively through filter assembly 64 and 63 where the stream merges with untreated mother liquor entering the system. Simultaneously, particulate concentrate and filtrate streams are removed continuously from the system. Although only three stages of filtration and backwash are shown in FIG. 6, a convenient number of stages is 6, where the pore sizes of the successive filter elements as measured in the maximum sized particles which each will pass is 200, 120, 80, 50, 30 and 20 microns. It is essential to note that the backwash in each case, approaching an upstream filter assembly, carries with it particles which are finer than the filter element which it is approaching, so that there is no tendency for such particles in the backwash fluid to be trapped by the next succeeding filter element.

Figure 7:
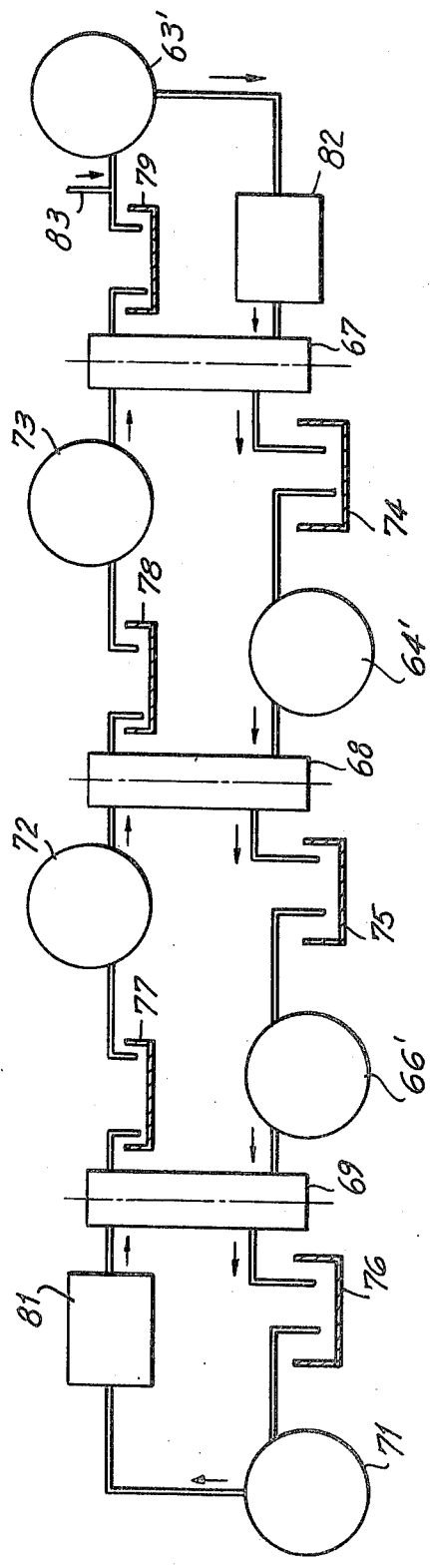
FIG. 7 is a schematic diagram showing a multistage apparatus in accordance with the present invention.

The multistage apparatus is particularly suitable for removing gummy products which have admixed fine particles. The gummy product lodges on the first stage and is scraped off by the collector. This makes it possible for the particles to pass through the filter of the first stage and to be picked off by filters downstream. Moreover, concentrates of particulate matter of different sizes may be removed from intermediate sumps. Such an arrangement is shown in FIG. 7. Again, a three-stage apparatus is depicted. Pumps 63', 64' and 66' transfer mother liquor in succession through filter assemblies 67, 68 and 69. Pumps 71, 72 and 73 transfer backwash fluid through filter assemblies 69, 68 and 67 in succession. Sumps 74 through 79 are positioned as shown for feeding each successive pump. Storage tanks 81 and 82 can be used for receiving filtrate and concentrated particulate. When operated on a batch basis, filtrate and concentrated particulate are removed from these two tanks. When operated on a continuous basis, mother liquor can be fed through line 83 continuously, and filtrate and concentrated particulate suspension removed continuously from the appropriate storage tanks 81 and 82. Also, one or more filter stages can be by-passed by the use of appropriate valves and conduits as shown in FIG. 5.

Figure 2:
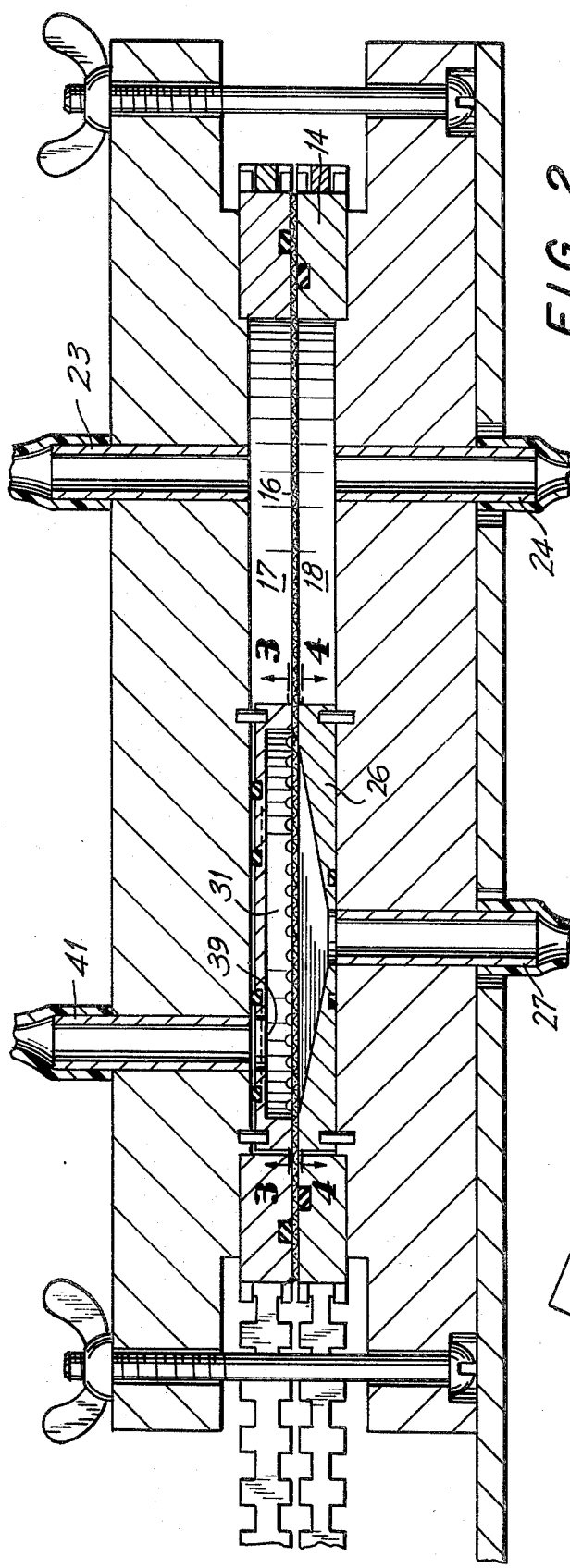
FIG. 2 is a sectional view taken along line 2—2 of FIG. 1.

As aforenoted, in the single stage filter assembly of FIG. 2, there may be some transfer of fluid between the collector pocket 31 and the mother liquor chamber 17. Similarly, there may be some transfer of pressurized backwash fluid into filtrate chamber 18. However, such transfer, though undesirable from the standpoint of overall throughput is nevertheless unimportant with respect to purity of the product since each stream is recycled as shown in FIG. 2 and as also occurs in the multistage apparatus of FIGS. 6 and 7. This latter leakage is indicated in FIG. 6 by the arrows 65.

With respect to FIG. 7, in order for the system shown to operate continuously, the various sumps should not be allowed either to run dry or to overflow. Accordingly, conventional level control devices can be used to hold the levels constant by controlling the speeds of the various pumps. Obviously, the flow rate of mother liquor through successive filters must be essentially equal and the same holds for the backwash fluid.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

It is also to be understood that the following claims are intended to cover all of the generic and specific features of the invention herein described, and all statements of the scope of the invention, which, as a matter of language, might be said to fall therebetween.

What is claimed is:

1. An improvement in an apparatus for continuous filtration including a filter assembly including an essentially cylindrical housing having opposed end walls, a rotatable disc-shaped filter element dividing said housing into first and second chambers, a mother liquor entry port in said housing for introduction of mother liquor into said first chamber, a filtrate exit port in said housing for removal of filtrate from said second chamber, an essentially wedge-shaped member within said second chamber, said member extending from one of said end walls to said rotatable filter element, said member having a radially directed slot of essentially constant width therein, a backwash entry port positioned for introduction of backwash fluid into said slot in said member and against said filter element, an essentially wedge-shaped collector pocket within said first chamber, said wedge-shaped pocket having a leading wall and a rear wall each making contact with the other of said end walls and with said rotatable filter element, a backwash effluent port communicating with said pocket for outflow of suspended filter cake removed from said filter element by said backwash fluid, and driving means for rotating said disc-shaped filter element to introduce filter-cake into said pocket for removal by said backwash fluid, wherein said improvement comprises a serrated edge on said leading wall, said edge being that making contact with said filter element, said edge being divided into lands and grooves, said grooves being sized to permit filter cake to be carried by said filter element when in rotation from said first chamber into said pocket, while impeding the flow of mother liquor from said first chamber into said pocket or flow of backwash fluid from said pocket into said first chamber, depending on the relative pressures in the fluids in said pocket and in said first chamber, the leading edges of said lands being tapered to direct filter cake on said filter element when in rotation into adjacent grooves.

2. The improvement as defined in claim 1, further comprising a filtrate sump positioned for receiving filtrate from said filtrate exit port, a first pump means connected for taking filtrate from said filtrate sump and supplying same to said backwash entry port, a particulate sump connected for receiving filter cake removed from said filter element, said filter cake being suspended in said backwash fluid, and second pump means connected for taking mother liquor from said particulate sump and supplying same to said mother liquor entry port, said first pump means being such as to pump at a lower rate than said second pump means, said apparatus when operated batchwise being suitable for yielding a concentrate of particulate matter and a repeatedly filtered filtrate from said mother liquor and when operated with continuous feed of mother liquor to said mother liquor entry port and continuous removal of particulate concentrate from said particulate sump and filtrate from said filtrate sump being suitable for yielding a repeatedly filtered filtrate.

3. The improvement as defined in claim 1, further comprising a storage tank connected intermediate said second pump means and said mother liquor entry port, said storage tank having a mother liquor input port for receiving mother liquor for filtration, said apparatus with said storage tank and mother liquor input port being suitable for producing a repeatedly filtered filtrate and a particulate concentrate on either a batch basis or a continuous basis.

4. An improvement in an apparatus for continuous filtration including a filter assembly including an essentially cylindrical housing having opposed end walls, a rotatable disc-shaped filter element dividing said housing into first and second chambers, a mother liquor entry port in said housing for introduction of mother liquor into said first chamber, a filtrate exit port in said housing for removal of filtrate from said second chamber, an essentially wedge-shaped member within said second chamber, said member extending from one of said end walls to said rotatable filter element, said member having a radially directed slot of essentially constant width therein, a backwash entry port positioned for introduction of backwash fluid into said slot in said member and against said filter element, an essentially wedge-shaped collector pocket within said first chamber, said wedge-shaped pocket having a leading wall and a rear wall, said leading wall making contact with the other of said end walls and approaching said rotatable filter element with sufficient clearance therebetween to permit entry of filter cake into said pocket, said rear wall making contact with the other of said end walls and with said rotatable filter element, a backwash effluent port, communicating with said pocket for outflow of filter cake removed from said filter element by said backwash fluid, and driving means for rotating said disc-shaped filter element to introduce filter-cake into said pocket for removal by said backwash fluid, wherein said improvement comprises a filtrate sump positioned for receiving filtrate from said filtrate exit port, a first pump means connected for taking filtrate from said filtrate sump and supplying same to said backwash entry port, a particulate sump connected for receiving filter cake removed from said filter element, said filter cake being suspended in said backwash fluid, and second pump means connected for taking mother liquor from said particulate sump and supplying same to said mother liquor port, said first pump means being such as to pump at a lower rate than said second pump means, said apparatus when operated batchwise being suitable for yielding a concentrate of particulate matter and a repeatedly filtered filtrate from said mother liquor and when operated with continuous feed of mother liquor to said mother liquor entry port and continuous removal of particular concentrate from said particulate sump and filtrate from said filtrate sump being suitable for yielding a repeatedly filtered filtrate, the improvement further comprising, a serrated edge on said leading wall, said edge being that making contact with said filter element, said edge being divided into lands and grooves, said grooves being sized to permit filter cake to be carried by said filter element when in rotation from said first chamber into said pocket, while impeding the flow of mother liquor from said first chamber into said pocket or flow of backwash fluid from said pocket into said first chamber, depending on the relative pressures in the fluids in said pocket and in said first chamber, the leading edges of said lands being tapered to direct filter cake on said filter element when in rotation into adjacent grooves.

5. The improvement as defined in claim 4, further comprising a storage tank connected intermediate said second pump means and said mother liquor entry port, said storage tank having a mother liquor input port for receiving mother liquor for filtration, said apparatus with storage tank and mother liquor input port being suitable for producing a repeatedly filtered filtrate and a particulate concentrate on either a batch basis or a continuous basis.

6. An improvement in an apparatus for continuous filtration including a filter assembly including an essentially cylindrical housing having opposed end walls, a rotatable disc-shaped filter element dividing said housing into first and second chambers, a mother liquor entry port in said housing for introduction of mother liquor into said first chamber, a filtrate exit port in said housing for removal of filtrate from said second chamber, said member extending from one of said walls to said rotatable filter element, said member having a radially directed slot of essentially constant width therein, a backwash entry port positioned for introduction of backwash fluid into said slot in said member and against said filter element, an essentially wedge-shaped collector pocket within said chamber, said wedge-shaped wall having a leading wall and a rear wall, said leading wall making contact with the other of said end walls and approaching said rotatable filter element with sufficient clearance therebetween to permit entry of filter cake into said pocket, said rear wall making contact with the other of said end walls and with said rotatable filter element, a backwash effluent port, communicating with said pocket for outflow of suspended filter cake removed from said filter element by said backwash fluid, driving means for rotating said disc-shaped filter element to introduce filter-cake into said pocket for removal by said backwash fluid, a serrated edge on said leading wall, said edge being that making contact with said filter element, said edge being divided into lands and grooves, said grooves being sized to permit filter cake to be carried by said filter element when in rotation from said first chamber into said pocket, while impeding the flow of mother liquor from said first chamber into said pocket or flow of backwash fluid from said pocket into said first chamber, depending on the relative pressures in the fluids in said pocket and in said first chamber, wherein said improvement comprises at least a second filter assembly, the mother liquor entry port of said second filter assembly being connected with said filtrate exit port of said filter assembly for receiving filtrate therefrom, the backwash effluent port of said second filter assembly being connected with said backwash entry port of said filter assembly for transferring backwash fluid thereto, a filtrate sump for receiving filtrate from the filtrate exit port of said second filter assembly, a first pump connected for transferring filtrate from said filtrate sump to the backwash entry port of said second filter assembly, conduit means connecting the backwash effluent port of said second filter assembly with said backwash entry port of said filter assembly, a particulate sump for receiving backwash fluid from said filter assembly, a storage tank for holding mother liquor to be filtered, said storage tank having an inlet port, a second pump for transferring fluid from said particulate sump to said storage tank and second conduit means connecting said storage tank with said mother liquor entry port in said filter assembly, the porosity of the filter element in said second filter assembly being lower than the porosity of the filter element of said filter assembly, said second filter assembly being considered equivalent to a succeeding filter assembly with respect to said filter assembly and where said apparatus comprises more than two filter assemblies, each filter assembly downstream from a contiguous assembly with respect to the flow of mother liquor toward said filtrate sump being considered a succeeding filter assembly, the filter element of each succeeding filter assembly having a smaller pore size than that of the immediately preceding filter assembly, said apparatus being operable on a continuous basis by feeding mother liquor continuously to said filter assembly, supplying backwash fluid from said filtrate sump to the furthest downstream filter assembly at a rate lower than the rate of input of mother liquor, and removing filtrate and particulate from the respective sumps at a rate equivalent to that at which said mother liquor is introduced into said apparatus, the improvement further comprising, a serrated edge on said leading wall, said edge being that making contact with said filter element, said edge being divided into lands and grooves, said grooves being sized to permit filter cake to be carried by said filter element when in rotation from said first chamber into said pocket, while impeding the flow of mother liquor from said first chamber into said pocket or flow of backwash fluid from said pocket into said first chamber, depending on the relative pressures in the fluids in said pocket and in said first chamber, the leading edges of said lands being tapered to direct filter cake on said filter element when in rotation into adjacent grooves.

7. A method of operating an apparatus for continuous filtration including a plurality of filter assemblies each including an essentially cylindrical housing opposed end walls, a rotatable disc-shaped filter element dividing said housing into first and second chambers, a mother liquor entry port in said housing for introduction of mother liquor into said first chamber, a filtrate exit port in said housing for removal of filtrate from said second chamber, an essentially wedge-shaped member within said second chamber, said member extending from one of said end walls to said rotatable filter element, said member having a radially directed slot of essentially constant width therein, a backwash entry port positioned for introduction of backwash fluid into said slot in said member and against said filter element, an essentially wedge-shaped collector pocket within said chamber, said wedge-shaped pocket having a leading wall and a rear wall making contact with the other of said end walls and with said rotatable filter element, a serrated edge on said leading wall, said edge being that making contact with said filter element, said edge being divided into lands and grooves, said grooves being sized to permit filter cake to be carried by said filter element when in rotation from said first chamber into said pocket, while impeding the flow of mother liquor from said first chamber into said pocket or flow of backwash fluid from said pocket into said first chamber, depending on the relative pressures in the fluids in said pocket and in said first chamber, the leading edges of said lands being tapered to direct filter cake on said filter element when in rotation into adjacent grooves, a backwash effluent port communicating with said pocket for outflow of suspended filter cake removed from said filter element by said backwash fluid, and driving means for rotating said disc-shaped filter element to introduce filter-cake into said pocket for removal by said backwash fluid, the direction of flow of mother liquor through successive filter assemblies being regarded as the reference stream in the use of the terms "upstream" and "downstream," wherein the improvement comprises the use of filter elements of smaller pore size in successive downstream filter assemblies, passing filtrate from each filter assembly to the mother liquor port of the next downstream filter assembly and repeating this step from the furthest upstream assembly to the furthest downstream filter assembly, passing the filtrate from the furthest downstream assembly into a filtrate sump, passing a portion of the filtrate from said filtrate sump to the backwash entry port of said furthest downstream assembly and successively through the backwash entry and exit ports of all assemblies, passing backwash fluid as particulate concentrate from the backwash exit port of the furthest upstream port to a particulate sump, passing particulate concentrate to the mother liquor entry port of the furthest upstream assembly, and continuing the process until the particulate concentrate reaches a desired concentration, and the filtrate reaches a desired freedom from particulate matter.

8. The method as defined in claim 7, wherein said apparatus further includes a storage tank connected for receiving mother liquor continuously from an external source, said storage tank being intermediate said particulate sump and said furthest upstream assembly and wherein said process further includes the steps of feeding mother liquor continuously to said storage tank, removing particulate concentrate continuously from said particulate sump and removing filtrate from said filtrate sump, the rates of removal being essentially equal to said rate of feeding mother liquor to said tank.

* * * * *